(12) United States Patent
Taylor (10) Patent No.: US 8,365,389 B2
(45) Date of Patent: Feb. 5, 2013

(54) MULTIFUNCTION TOOL FOR DEPALLETISING

(75) Inventor: Neil Taylor, West Geelong (AU)

(73) Assignee: Visy R & D Pty Ltd, Melbourne, Victoria (AU)

( * ) Notice: Subject to any disclaimer, the term of this patent is extended or adjusted under 35 U.S.C. 154(b) by 769 days.

(21) Appl. No.: 12/566,971

(22) Filed: Sep. 25, 2009

(65) Prior Publication Data

US 2010/0074720 A1    Mar. 25, 2010

(30) Foreign Application Priority Data

Sep. 25, 2008 (AU) ................................ 2008227052

(51) Int. Cl.
*B23P 23/00* (2006.01)
*B65B 69/00* (2006.01)
(52) U.S. Cl. ............. 29/564.3; 29/426.4; 83/909; 294/2
(58) Field of Classification Search .................. 29/564.3, 29/564.1, 564.6, 564.8, 50, 51, 566.1, 566; 294/2; 83/943, 945, 909; 414/412
See application file for complete search history.

(56) References Cited

U.S. PATENT DOCUMENTS

| 4,771,670 | A | * | 9/1988 | Woerman ........................ 83/861 |
| 4,787,810 | A | * | 11/1988 | Cawley et al. ................. 414/591 |
| 4,789,295 | A | * | 12/1988 | Boucher et al. ............... 414/497 |
| 4,835,836 | A | * | 6/1989 | van Uitert ..................... 29/564.3 |
| 5,044,937 | A | * | 9/1991 | Lisa ................................. 432/5 |
| 5,242,121 | A | * | 9/1993 | Neier .............................. 241/28 |
| 5,297,329 | A | * | 3/1994 | Santin et al. ................. 29/564.3 |
| 5,400,493 | A | * | 3/1995 | Hall ............................. 29/426.4 |
| 2007/0044603 | A1 | * | 3/2007 | Scholtes et al. ................... 83/13 |

* cited by examiner

*Primary Examiner* — Erica E Cadugan
(74) *Attorney, Agent, or Firm* — Rothwell, Figg, Ernst & Manbeck, P.C.

(57) ABSTRACT

A multifunctional tool which enables a single robot or other manipulator to perform each of the operations to depalletize a palletized load is disclosed. The depalletization can proceed without the need to move the palletized load from one station to another. The multifunctional tool includes a strap cutting mechanism, extendable vacuum arms, and a fork lift mechanism.

12 Claims, 7 Drawing Sheets

MULTIFUNCTION TOOL FOR DEPALLETISING

FIELD

This invention relates to a multifunctional tool for use with a robotic manipulator in the depalletising of palletised loads.

BACKGROUND

Depalletizing is an essential function which usually involves moving a strapped palletized load to a destrapping station for removal of the straps, either manually or by means of a destrapping robot, such as is described in our US Patent Application US2007/0044603 Al Scholtes et al. (the contents of which are incorporated herein by cross-reference; see also FIGS. 6 and 7 of the present application which are recreations of FIGS. 2-3 of US 2007/0044603, with "A's" added after the reference characters for clarity). The top frame of the palletized load is then removed by means of another mechanism and put on a stack for subsequent use. The pallet is then conveyed to a depalletizing station where a robot carrying a forklift mechanism depalletizes the load in a known manner.

It will be appreciated that the need to move the pallet from the destrapping station to the depalletising station is time-consuming, and that the need to provide a destrapping robot, a top frame removing mechanism and a depalletising robot increases capital costs and ultimately the total cost of operations.

SUMMARY

It is an object of the present invention to provide a multifunction tool or similar device which enables a single robot or other manipulator to perform each of the operations necessary to achieve depalletisation of a palletised load, in one position, without the need to move the palletised load from one station to another.

The invention provides a multifunction tool for attachment to a controlling device such as a robotic arm, comprising a supporting means carrying a strap cutting mechanism, a retractable fork lifting mechanism arranged such that the strap cutting of the straps around the palletised load and depalletising of the palletised load are carried out using the tool without the palletised load having to be moved from one position to another.

In a preferred form, the multifunction tool further includes a top plate removing mechanism which is operative to lift the top plate from the palletised load after destrapping for transfer to a top plate collection position.

In one form, the top plate removing mechanism is retractably mounted on the supporting means for deployment into an operative position following strap cutting and before depalletising.

In another aspect, the invention provides a destrapping and depalletising tool for attachment to a controlling device such as a robot arm, comprising a supporting means carrying a strap cutting mechanism, a retractable top frame removing mechanism and a retractable fork lifting mechanism arranged such that destrapping, top frame removal and depalletising are able to be carried out by said tool without moving a pallet carrying a load restrained by straps and a top frame from one position to another.

The strap cutting mechanism may include means for locating one of multiple straps around the palletised load, means for engaging said one strap and means for cutting the strap while engaged.

The means for engaging said one strap may be such that tension is applied to the strap by the controlling device so that the strap is cut while under tension.

The strap cutting mechanism may include means for holding said one of said straps after it has been cut to enable the cut strap to be removed from the load for disposal.

The means for holding said one of said straps after cutting may comprise one of a pair of clamps for clamping the strap for cutting.

The top frame removing means may include two or more vacuum conveying legs having vacuum seal means at their free ends and being pivotally mounted on the supporting means for movement from a retracted position to a deployed position where the vacuum heads are positioned to be brought into engagement with a top frame for removal of the top frame from a palletised load.

The retractable fork lifting mechanism includes a pusher means carried by the supporting means and having a high friction face positioned for engagement with the palletised load, means for detecting engagement of the load by the pusher means and for causing the controlling device to move the supporting means to lift part of the palletised load to create a space for receiving tyne means of the retractable fork lift mechanism to engage under the portion of the palletised load to allow removal of that portion.

The tool may also carry one or more means for engaging the top of the portion of the palletised load after engagement by the fork lift mechanism to secure the load for removal from the pallet.

Other features of the multifunction tool will become apparent from the following description of an embodiment with reference to the accompanying drawings in which.

DESCRIPTION OF EMBODIMENT

As illustrated in the drawings, the multifunction tool 1 according to the embodiment includes a supporting means in the form of a mounting plate 2 which centrally supports a known robot arm attachment device 3, a fork lift mechanism 4 at one side and a strap cutting mechanism 5 at the other side, together with extendable vacuum arms 7 at each corner.

Figure 1:
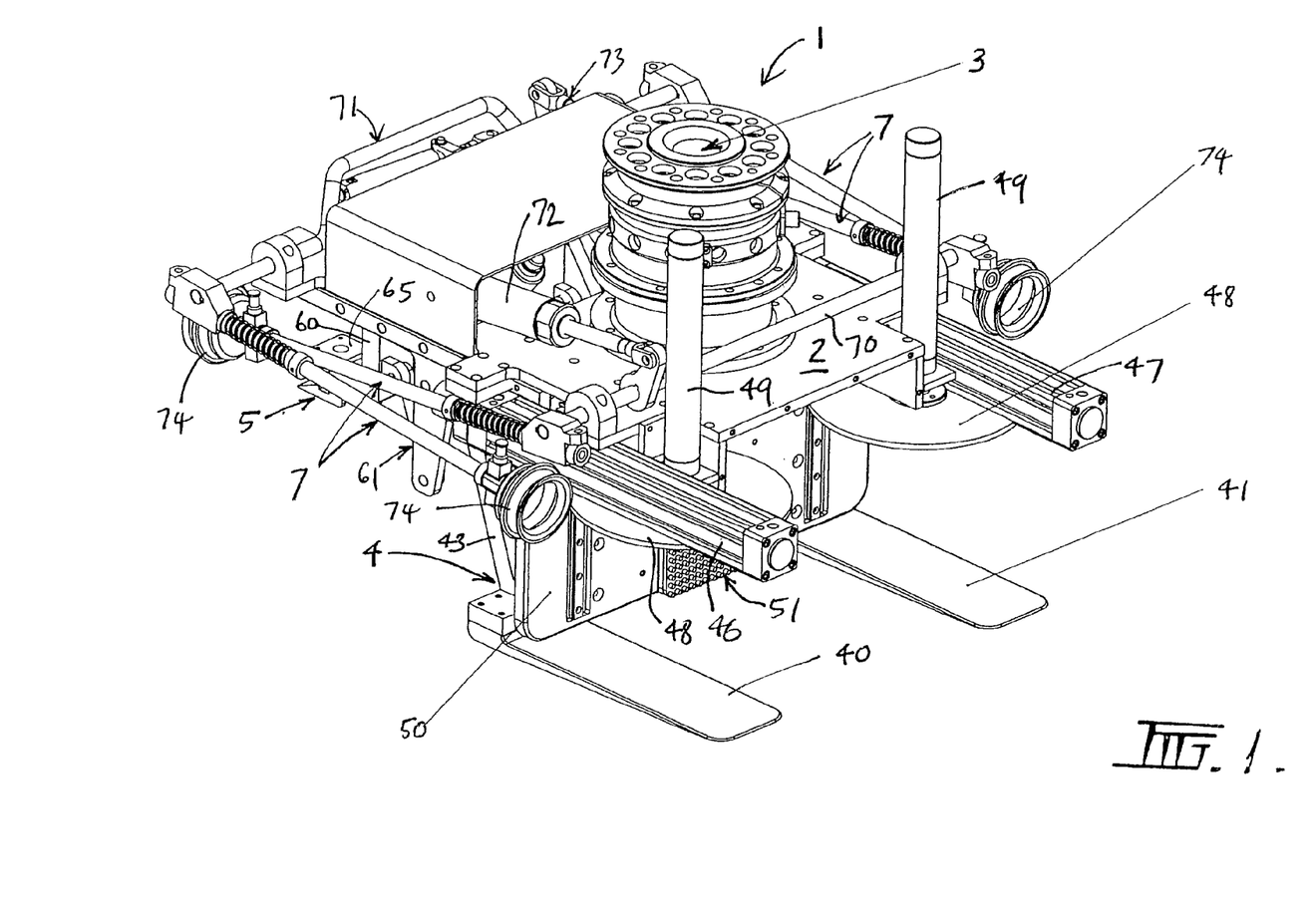
FIG. 1 is a perspective view from one side of a multifunction tool embodying the invention.
Figure 2:
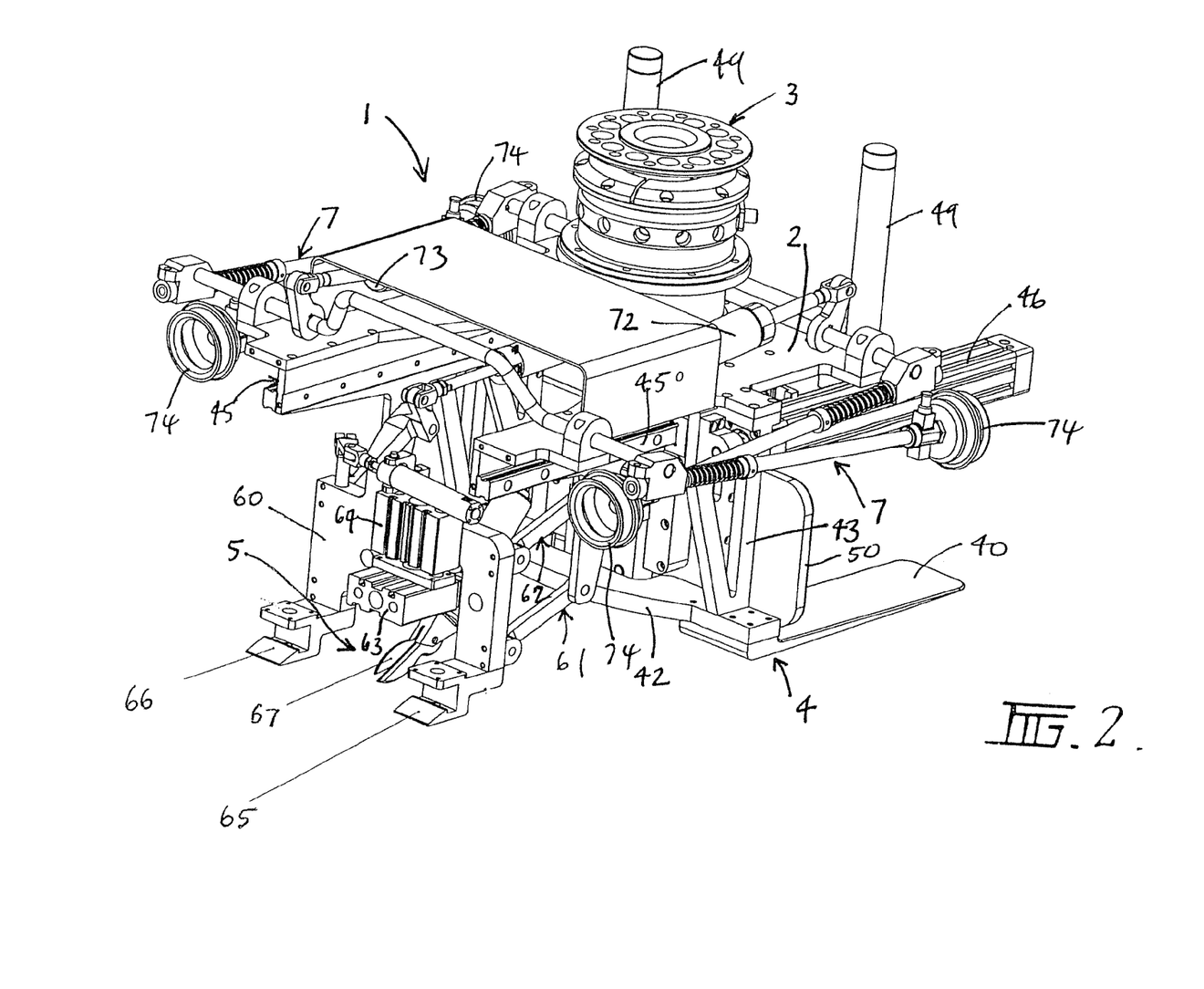
FIG. 2 is a perspective view of the tool of FIG. 1 from the other side.
Figure 3:
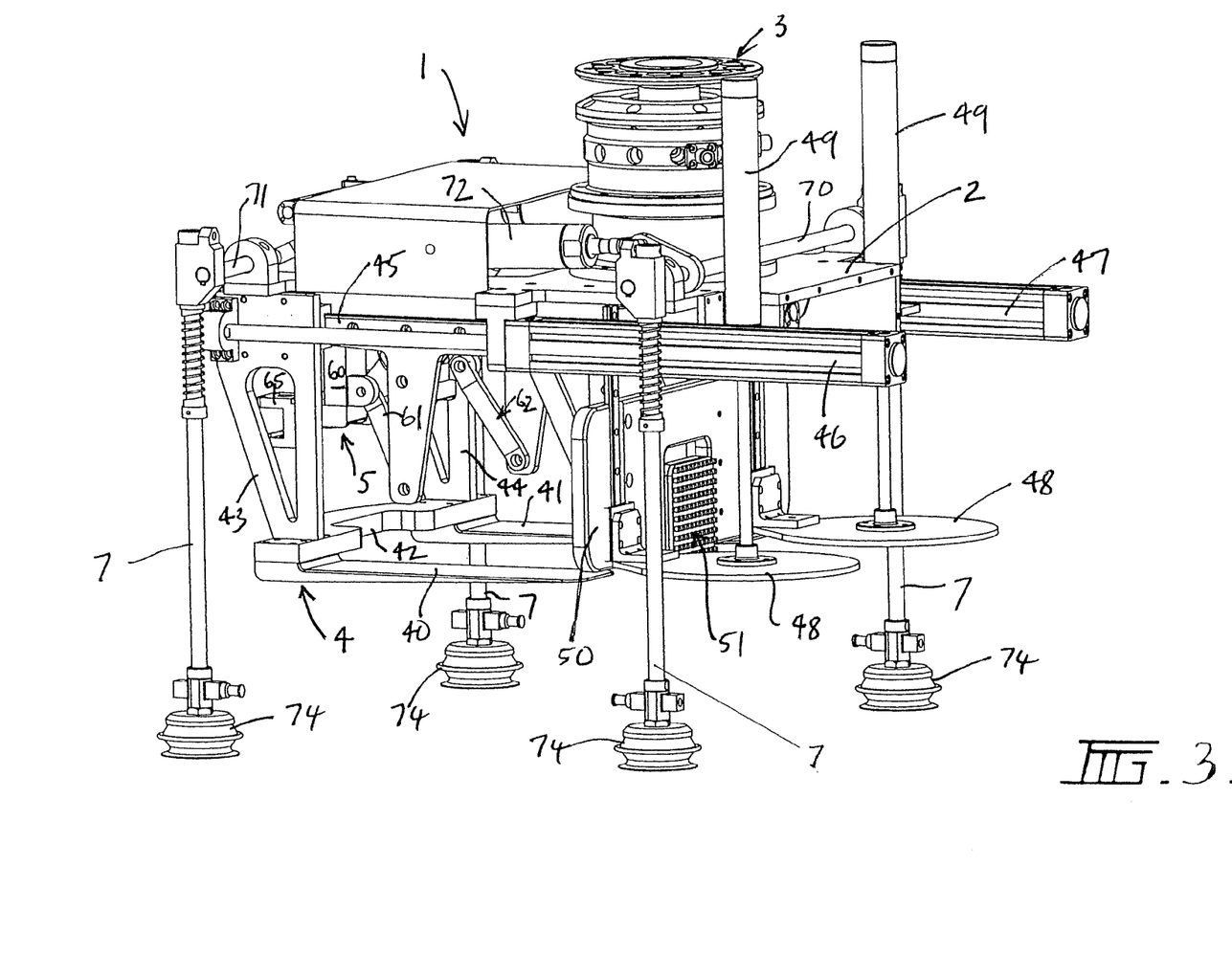
FIG. 3 is a perspective view from one side of the tool showing the top frame removing mechanism in the deployed position and the retractable fork lift mechanism in the retracted position.
Figure 4:
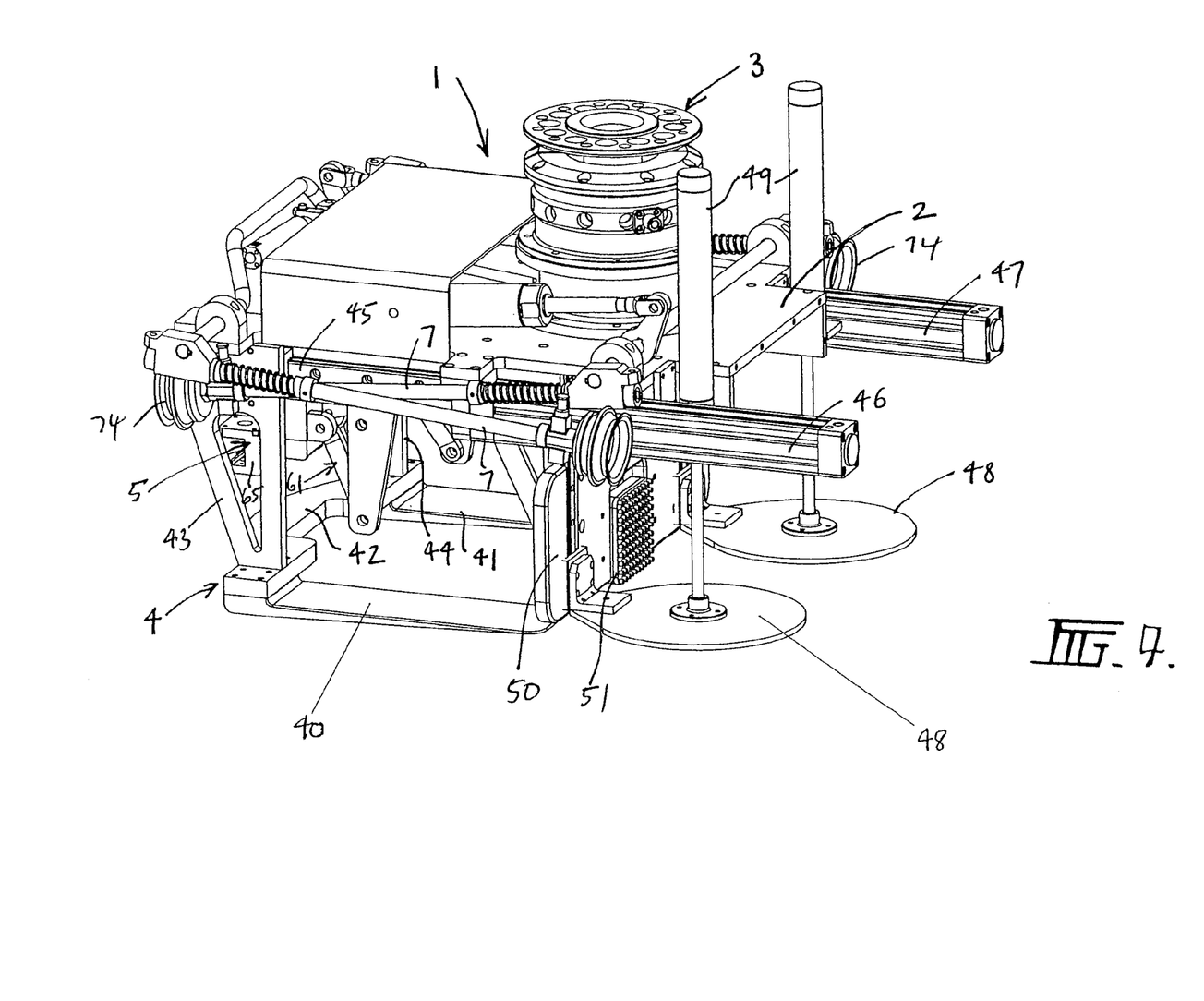
FIG. 4 is a perspective view of the tool with all mechanisms retracted and the hold down pads lowered.

The fork lift mechanism 4 comprises spaced fork tines 40, 41, mounted on a cross-plate 42 carried by side arms 43, 44 engaging tracks 45 and moveable back and forward by pneumatic cylinders 46, 47 connected to the side arms 43, 44 as illustrated. The cylinders 46, 47 are operable to move the fork times 40, 41 from the fully retracted position illustrated in FIGS. 3 and 4 to the fully advanced position illustrated in FIGS. 1 and 2 under the control of the robot (not shown).

Figure 5:
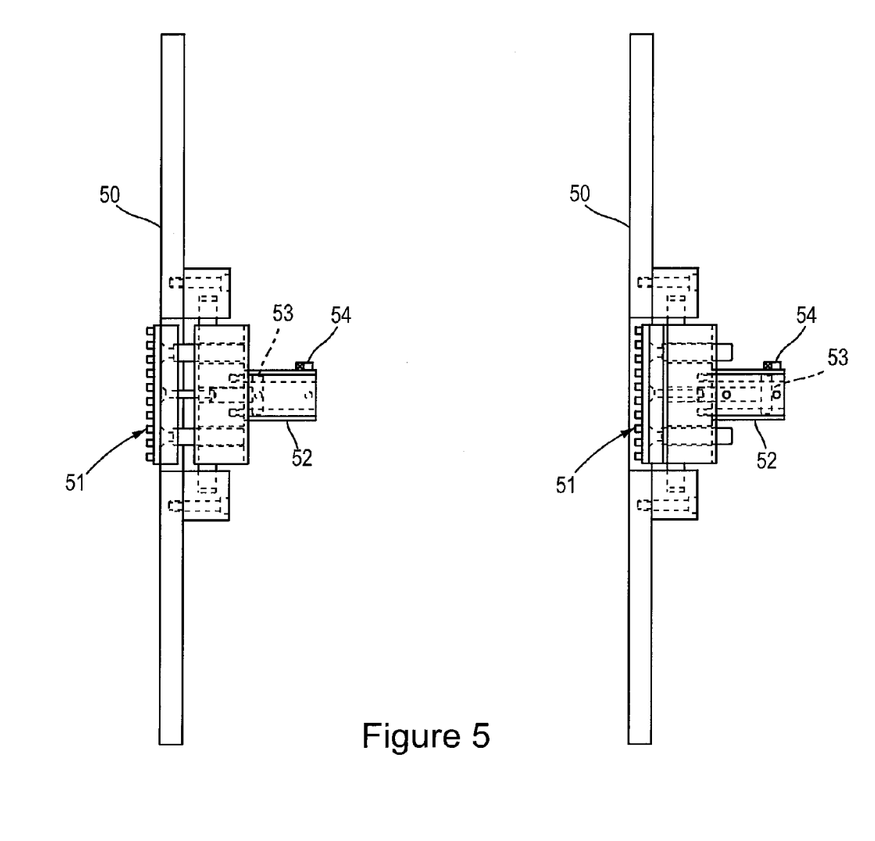
FIG. 5 schematically illustrates the gripper push pad in the extended and retracted positions.

The fork lift mechanism 4 is located behind a back plate 50 carried by the mounting plate 2 and having a central gripper pushing pad 51 mounted on a pneumatic cylinder 52 (FIG. 5) carried by the back plate 50 and operative to extend and retract the pad 51 to engage the side of a pallet load portion in the extended position illustrated with a sufficient force to allow the tool to lift the load portion sufficiently to facilitate penetration of the fork tines 40, 41 to engage the load portion. The cylinder 52 has a magnetised piston 53 which operates a reed switch 54 mounted on the pneumatic cylinder 52 to signal the robot to stop moving forward when the pad 51 is applying the required engaging force to allow the load portion to be lifted. When the pressure against the pad 51 exceeds the pressure in the cylinder 52, the piston 53 and pad 51 retract, as illustrated, to activate the reed switch 54. In this way, the cylinder 52 operates as a variable pressure spring which allows the required pressure to be applied to the load portion and causes the reed switch 54 to control the robot accordingly.

The fork lift mechanisms 4 include an associated load clamping mechanism comprising circular hold down pads 48 operated by pneumatic cylinders 49 mounted at one end of the mounting plate 2 as illustrated. The hold down pads 48 operate to apply a clamping force to the load after the forks 40, 41 engage part of the load during depalletising and transfer of the part of the load to the required conveyor or other location.

The strap cutting mechanism 5 is carried by a frame 60 mounted on linkages 61, 62 which allow the mechanism 5 to be extended, retracted and positioned for strap cutting by a pair of cylinders 63 and 64. Frame 60 carries a fixed jaw 65 on one side and a swivel jaw 66 on the other side, with each jaw carrying a strap clamping mechanism of the type described in our earlier US Patent Application US 2007/0044603 A1 Scholtes et al., and shown in FIGS. 6 and 7 of the present drawings for the purposes of clarity. The cylinder 64 operates to lower the shears 67 under the strap cutting position. Means for locating a strap may include one or more optical or photoelectric means for locating at least one part of the strap. The optical or photoelectric means may be located adjacent the cutting means or the engaging means so that the cutting means is operable to cut the strap while engaged. The means for engaging the strap may include a clamp for securely clamping the strap when it has been located to prevent undesirable movement of the strap while it is being cut. In one embodiment, the working head carries a pair of clamps, one on either side of the cutting means. The means for engaging the strap may include a structure which gathers the strap as the head moves over the strapped load to enable the locating means to identify that a strap has been located. In one embodiment a structure of this sort is associated with each optical strap locator and each clamp.

Figure 6:
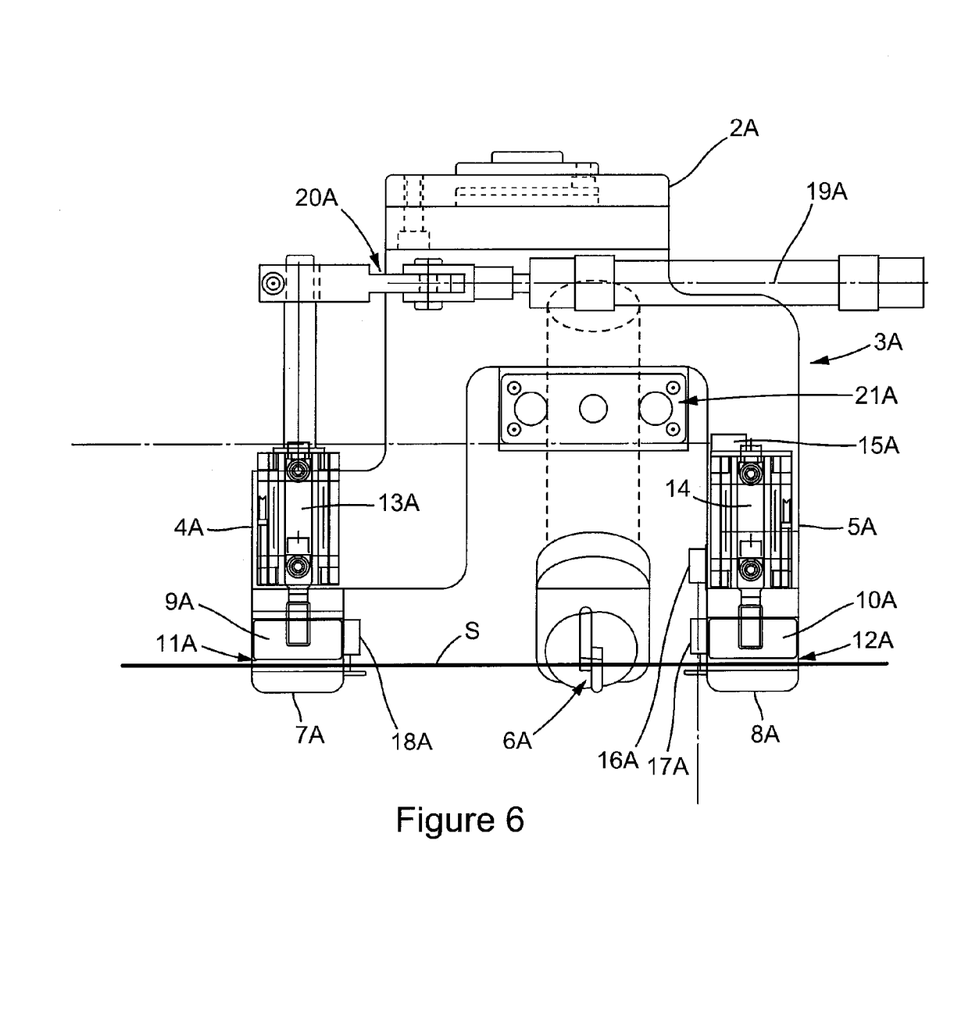
FIG. 6 is a recreation of FIG. 2 from US 2007/0044603.
Figure 7:
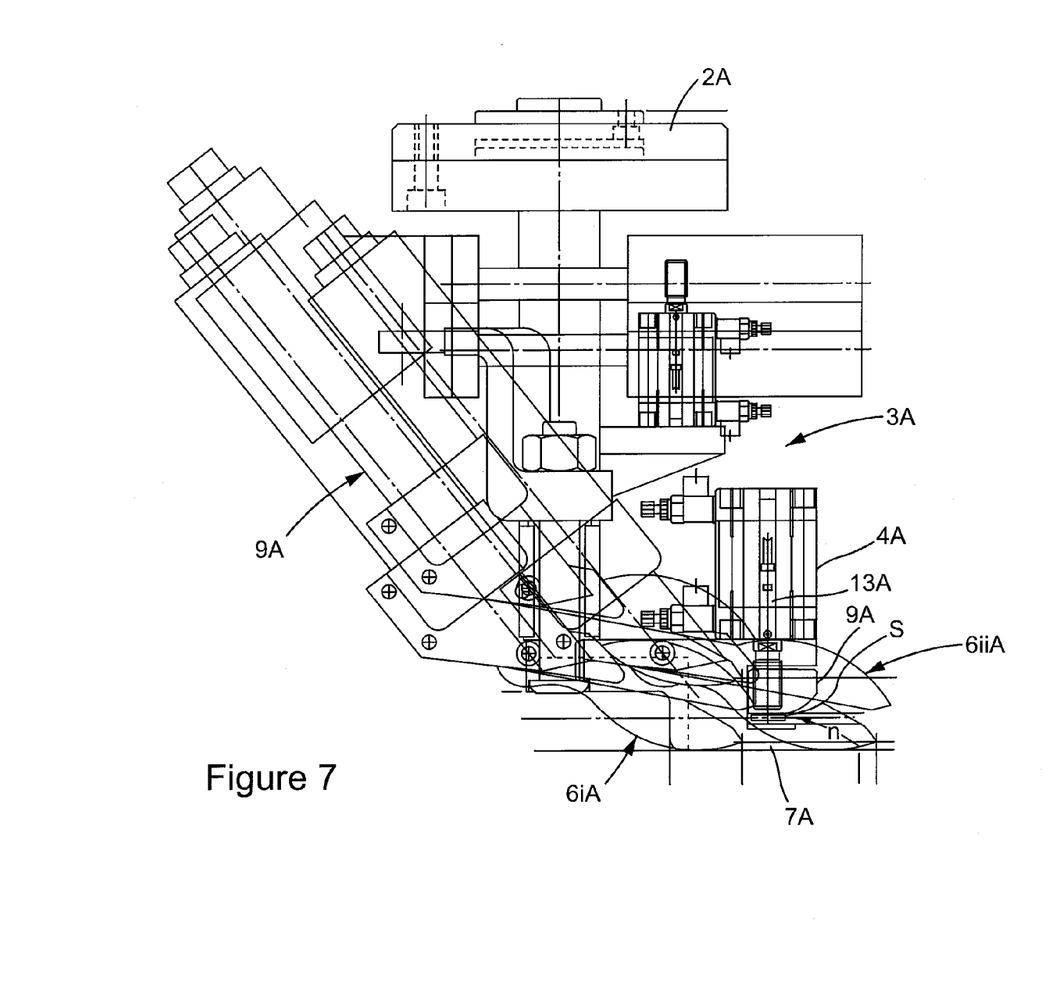
FIG. 7 is a recreation of FIG. 3 from US 2007/0044603.

As described by US Patent Application 2007/0044603 to Scholtes, referring to FIGS. 6 and 7, the destrapping tool 3A includes a pair of spaced depending strap locating legs 4A and 5A, between which is positioned a strap cutter 6A, which is movable between the positions illustrated in FIG. 7, through the line of strap S when located as illustrated, during the cutting operation. Each leg has a lower foot portion 7A, 8A, which is designed to engage under the strap S during the strap locating operation, in the position illustrated in FIGS. 6 and 7. Spaced above each foot 7A, 8A are clamping anvils 9A, 10A which are spaced from each respective foot as illustrated to create strap receiving gaps 11A, 12A. When the strap S has been located as shown, the anvils 9A,10A are actuated by cylinders 13A,14A to clamp the strap S in position for the cutting operation.

The tool 3A includes four photoelectric sensors 15A to 18A positioned as shown to locate the top and an edge of the palletized load and the straps S. Sensor 15A finds the position of the top of the load while sensor 16A finds the position of one edge of the load from which the tool 3A commences its search for the straps S at the top of the load. Sensor 16A has a fixed sensing range and the tool 3A is moved to within 5 to 10 mm of the top of the load to locate the straps S.

The sensors 17A and 18A find one of the straps S, the robot moving the tool 3A until the strap S is located in one of the gaps 11A or 12A where it is detected by one of the sensors 17A or 18A. The robot arm is then rotated until the other of the sensors 17A or 18A detects the presence of the strap S within the other of the gaps 11A or 12A. The strap is then clamped by the clamps 9A and 10A and the cutter 6A actuated to cut the strap S. During the cutting operation, the cutter 6A moves through the location of the strap as illustrated, by means of cutter extend cylinder 21A. The cutter extend cylinder 21A is then retracted and the clamp 10A released, at which time the robot moves the tool 3A and the strap S still clamped by the clamp 9A to a position for disposal of the strap S. The operation of the strap cutting mechanism 5 will be more fully understood by reference to the US Patent Application referred to above and further description will not be provided in the present specification.

The vacuum arms 7 are carried by shafts 70, 71 mounted for rotation on the mounting plate 2 and driven by pneumatic cylinders 72, 73, by means of which the arms 7 are raised and lowered under the control of the robot. Each arm 7 carries a vacuum suction cup 74 by means of which the top plate of a palletised load is engaged for removal by the tool under the control of the robot.

The tool 1 described above will be understood to have 3 primary functions:
Strap cutting, top frame removal and removal or depalletising of portions of the load until the pallet is fully depalletised.

Strap cutting is performed to release the holding pressure applied to the palletised load to provide stability during transport. Once the strapped pallet is conveyed to an unloading station within the region of operation of the robot carrying the tool 1, the robot will perform a search function using a diffuse mode photo electric switch (not shown). The search function will determine the orientation of the top frame and its height. The robot will then lower the strap cutting mechanism 5 of the tool 1 to allow for the necessary range of movement of the strap cutting mechanism. The robot then moves the tool into a cut-out region in the top frame of the palletised load (not shown) to allow the cutting mechanism 5 to search and locate the holding straps. The robot moves or searches in the horizontal plane until one of a number of reflective photo electric switches (not shown) on the gripper jaws is triggered by the strapping. The robot then orients the tool 1 to rotate until the other gripper photo electric switch is triggered by the strapping. Once both gripper sensors are triggered, the pneumatic gripper jaws clamp the strap and the robot moves about 10 to 20 millimetres in a vertical direction to ensure that the strapping his held under tension. The cutting shears 67 are then lowered in position and advanced to bring the blades of the shears into contact with the strap after which the strap is cut. Once this operation has cycled twice, the fixed jaw gripper releases the strap and allows the robot to move the gripper and strap end to the strap chipping machine (not shown). As the robot approaches the chipper, the chipper is started and the robot places the strap end into the feed-in rolls of the chipper which then shreds the strap for recycling. The robot releases the strap and returns to the pallet to continue the destrapping process. Once all straps are cut and removed, the strap cutting 5 is raised into the body of the tool (FIGS. 1 and 3) to allow for the necessary working space for the depalletising process.

As mentioned above, top frames are fitted to the top of the palletised load and strapped through the pallet to increase the stability of the pallet and load during transport. Once the straps have been removed, the robot then moves to a position over the pallet. The robot then triggers a pneumatic valve to lower the vacuum arms 7 and a separate valve turns on the air to the vacuum generators which are mounted directly on top of the suction cups 74 at the ends of the vacuum arms 7. The robot lowers the tool 1 to bring the vacuum cups 74 into contact with the top frame and allows a short delay to ensure that good vacuum pressure between the top frame and the suction cups 74 is established. The robot then manipulates the tool 1 to lift the top frame from the palletised load to a drop off location to form a stack of removed top frames for later use.

Once the top frame is removed, the robot moves the tool 1 adjacent to the palletised load ready for depalletising, the height and position being determined earlier in the process of strap cutting and top frame removal. The fork times 40, 41 are in their retracted position and the pusher pad 56 is extended. The robot moves the pusher pad towards the palletised load until contact is made with a portion of the load until the load is pushed into a suitable stop frame (not shown). Once the load makes contact with the stop frame, the pusher pad 56 is depressed once the air pressure set to extend the pad is a lesser force than the robot pushing into the stop frame. This is detected via the reed switch mounted on the pusher pad air cylinder. The robot will now make a vertical movement to lift one side of the load portion engaged by the pusher pad to provide enough space to accommodate the fork lift times 40, 41 to engage under the load portion. The robot will then pause for a short period and will then extend the tines 40, 41 under the load portion. Once the tines 40, 41 are extended, the hold down pads 50, 51 are lowered by their pneumatic cylinders to clamp the load portion and the pusher pad 56 is then retracted. The robot then manipulates the tool with the load portion clamped in place to a drop off station. The robot places the load portion onto the drop off station and releases the hold down pads 50, 51 and shortly after retracts the tines 40, 41. The tool 1 is then able to move away from the load portion and return to the pallet to pick up another load portion.

It will be appreciated from the above that the multifunction tool facilitates strap cutting, top frame removal and depalletising at a single location using a single robot or like manipulator. This saves processing time and capital costs and as such reduces the overall cost of depalletising.

The invention claimed is:

1. A multifunction tool for attachment to a robotic arm, the multifunction tool being for use with a palletized load, the palletized load including a pallet on which a load is stacked, a top plate positioned on top of the stacked load, and straps engaged around the top plate and pallet to hold the stacked load in place, the multifunction tool comprising:
   a supporting means carrying a strap cutting mechanism configured for cutting the straps;
   a fork lifting mechanism carried by the supporting means and having tines configured for lifting the stacked load from the pallet, the tines configured to be advanced and retracted relative to the supporting means in a longitudinal direction of the tines; and
   pivoting vacuum arms carried by the supporting means and configured to be pivoted with respect to the supporting means between an orientation wherein the arms are configured to remove the top plate from the stacked load, and an orientation wherein the arms are not configured to remove the top plate from the stacked load;
   the strap-cutting mechanism, the fork lifting mechanism, and the vacuum arms being arranged such that the strap cutting of the straps around the palletized load and a depalletizing of the stacked load from the pallet are carried out using the multifunction tool without the palletized load having to be moved from one position to another.

2. The multifunction tool of claim 1, wherein the removal of the top plate from the stacked load occurs via using the vacuum arms to lift the top plate from the stacked load after the strap cutting for transfer of the top plate to a top plate collection position.

3. The tool of claim 1, wherein the pivoting of the vacuum arms is caused by pneumatic cylinders.

4. The tool of claim 1, wherein, the strap cutting mechanism includes means for locating one of the straps of the palletized load, means for engaging said one strap, , and means for cutting the strap while the strap is engaged by the means for engaging.

5. The tool of claim 4, wherein the means for engaging said one strap is such that tension is applied to the one strap by the robotic arm so that the one strap is cut while under tension.

6. The tool of claim 1, wherein the strap cutting mechanism includes means for holding one of said straps after the one strap has been cut to enable the cut strap to be removed from the stacked load for disposal of the cut strap.

7. The tool of claim 6, wherein the means for holding said one of said straps after cutting comprises one of a pair of clamps for clamping the one strap for cutting.

8. The tool of claim 1, wherein the pivoting vacuum arms comprise vacuum conveying legs having vacuum seal means at free ends thereof, and when the pivoting vacuum arms are pivoted to the orientation wherein the arms are configured to remove the top plate from the stacked load, the vacuum seal means are positioned so as to be brought into engagement with the top plate for removal of the top plate from a the stacked load.

9. The tool of claim 1, wherein the tool includes a pusher means carried by the supporting means proximal to the fork lifting mechanism and having a face positioned for engagement with the stacked load, means for detecting engagement of the stacked load by the pusher means and for causing the robotic arm to move the supporting means to lift the stacked load to create a space for receiving the tines of the fork lifting mechanism to engage the stacked load at a location underneath the stacked load to allow removal of stacked load from the pallet.

10. The tool of claim 9, wherein the pusher means is carried by a pneumatic cylinder to which a predetermined pressure is applied, and including switch means actuatable by retraction of a piston of the pneumatic cylinder upon the pressure generated by the pusher means engaging the stacked load exceeding the predetermined pressure in the cylinder.

11. The tool of claim 1, wherein the tool also carries one or more means for engaging the top of the portion of the stacked load after engagement of the stacked load by the fork lifting mechanism to secure the stacked load for removal of the stacked load from the pallet.

12. A destrapping and depalletizing tool for attachment to a robotic am, the destrapping and depalletizing tool being for use with a palletized load, the palletized load including a pallet on which a load is stacked, a top frame positioned on top of the stacked load, and straps engaged around the top frame and pallet to hold the stacked load in place, the destrapping and depalletizing tool comprising:
   a supporting means carrying a strap cutting mechanism configured for cutting the straps;
   a top frame removing mechanism comprising pivoting vacuum arms carried by the supporting means and configured to be pivoted with respect to the supporting means between an orientation wherein the arms are configured to remove the top frame from the stacked load, and an orientation wherein the arms are not configured to remove the top frame from the stacked load;

and a fork lifting mechanism carried by the supporting means and having tines configured for lifting the stacked load from the pallet, the tines configured to be advanced and retracted relative to the supporting means in a longitudinal direction of the tines; and the strap cutting mechanism, the top frame removing mechanism, and the fork lifting mechanism being arranged such that the strap cutting, the top frame removal and, the lifting of the stacked load from the pallet are able to be carried out by said tool without moving the palletized a load from one position to another.

* * * * *